United States Patent
Müller

(10) Patent No.: US 12,351,396 B2
(45) Date of Patent: Jul. 8, 2025

(54) ROOT CROP CONVEYOR

(71) Applicant: Grimme Landmaschinenfabrik GmbH & Co. KG, Damme (DE)

(72) Inventor: Fokke Müller, Diepholz (DE)

(73) Assignee: Grimme Landmaschinenfabrik GmbH & Co. KG, Damme (DE)

( * ) Notice: Subject to any disclaimer, the term of this patent is extended or adjusted under 35 U.S.C. 154(b) by 0 days.

(21) Appl. No.: 18/248,151

(22) PCT Filed: Oct. 11, 2021

(86) PCT No.: PCT/EP2021/078037
§ 371 (c)(1),
(2) Date: Apr. 6, 2023

(87) PCT Pub. No.: WO2022/074256
PCT Pub. Date: Apr. 14, 2022

(65) Prior Publication Data
US 2023/0373728 A1 Nov. 23, 2023

(30) Foreign Application Priority Data
Oct. 9, 2020 (DE) .......................... 102020126560.3

(51) Int. Cl.
B65G 39/12 (2006.01)
A01D 17/06 (2006.01)
B65G 13/12 (2006.01)

(52) U.S. Cl.
CPC ............ B65G 39/12 (2013.01); B65G 13/12 (2013.01); *A01D 17/06* (2013.01); *B65G 2201/0211* (2013.01)

(58) Field of Classification Search
CPC ................... B65G 39/12; B65G 13/12; B65G 2201/0201; A01D 17/06
(Continued)

(56) References Cited

U.S. PATENT DOCUMENTS 2,670,846 A * 3/1954 Rienks ................... A01D 17/06
209/672
5,697,451 A 12/1997 Nicholson
(Continued)

FOREIGN PATENT DOCUMENTS

CA 2836446 A1 * 6/2014 ........... B29C 43/245
DE 10142436 A1 3/2003
(Continued)

*Primary Examiner* — James R Bidwell
(74) *Attorney, Agent, or Firm* — Husch Blackwell LLP

(57) ABSTRACT

A root crop conveyor is provided for cleaning and/or separating root crops, including at least two adjacent roller groups, each of which have at least two rollers, which each rotate about an axis of rotation and of which the axes of rotation form a roller group plane. An adjusting device is provided with at least one adjusting means. At least the rollers of at least one roller group are mounted, on one side, in at least one side part which interacts with the adjusting means, such that actuation of the adjusting means can give rise to movement of the at least one roller group plane relative to a frame in which the root crop conveyor can be arranged. wherein the adjusting device pivots the roller group plane. The rollers of a roller group are connected to one another via a scissors mechanism.

15 Claims, 8 Drawing Sheets

(58) Field of Classification Search
USPC ............ 193/35 R, 35 TE; 177/113, 115, 133
See application file for complete search history.

(56) References Cited

U.S. PATENT DOCUMENTS

| | | | |
|---|---|---|---|
| 9,598,240 B2 * | 3/2017 | Mast ...................... | B65G 15/12 |
| 10,543,986 B1 * | 1/2020 | Sines ..................... | B65G 13/02 |
| 10,894,668 B1 * | 1/2021 | Zimmer ................. | B65G 13/11 |

FOREIGN PATENT DOCUMENTS

| | | | |
|---|---|---|---|
| EP | 678234 | A1 | 10/1995 |
| EP | 1736249 | A1 | 12/2006 |
| EP | 2997807 | A1 | 3/2016 |
| EP | 3085644 | B1 | 12/2018 |

* cited by examiner

ROOT CROP CONVEYOR

CROSS REFERENCE

This application claims priority to PCT Application No. PCT/EP2021/078037, filed Oct. 11, 2021, which itself claims priority to German Patent Application No. 10 2020 126560.3, filed Oct. 9, 2020, the entireties of both of which are hereby incorporated by reference.

FIELD OF THE INVENTION

The present invention relates to a root-crop conveyor for cleaning and/or separating root crops.

BACKGROUND OF THE INVENTION

A root-crop conveyor of the type in question is known from DE 101 42 436 A1. Root-crop conveyors are also known from U.S. Pat. No. 5,697,451 and from EP 0 678 234 A1.

SUMMARY OF THE INVENTION

The object of the present invention is to improve a root-crop conveyor of the type in question in terms of its separating performance.

In the case of a root-crop conveyor according to the invention, the adjusting device is designed in order to pivot the roller-group plane in particular in relation to an axis of rotation of a roller of an adjacent roller group. As a result, it is possible to realize different gradients along the conveying path and a cascading arrangement of the same, which allows more variation in the separating performance. This involves, for example, an upwardly sloping conveying path of a first roller group, which merges, via a transfer step and the root crops dropping downward as a result, into a once again upwardly sloping conveying-path portion of a further roller group. As an alternative, or in addition, a downwardly sloping conveying path of a first or further roller group can merge into a gradient of a subsequent roller group. Both—possibly supplementary—variants are suitable for achieving intensive and, at the same time, careful cleaning.

Pivoting here means that a perpendicular line which, as seen from the roller-group plane, intersects the axis of rotation of the adjacent roller group—in comparison with the state prior to and following pivoting—is likewise pivoted. As an alternative, or in addition, this involves pivoting in relation to an underlying surface, i.e., following pivoting, the roller-group plane is located at a different angle in relation to the horizontal underlying surface than it is prior to pivoting.

Furthermore, a root-crop conveyor according to the invention is distinguished in that the rollers of at least one roller group are connected to one another via a scissors mechanism. This makes possible a straightforward change in distance between the axes of rotation of a roller group, it being possible in particular for this change in distance to be varied by way of a single adjusting means. In particular, it is possible to use at least two adjusting means to achieve a change in distance between the axes of rotation of the rollers of all the respective roller groups independently of the pivoting of the roller-group planes. In combination with pivotability of the planes of a roller group, optimized adaptability to a large number of root crops and cleaning requirements is achieved.

In particular, an adjusting means which is provided for changing the distance between the axes of rotation of a roller group is provided in order to adjust the distance between the axes of rotation of all the roller groups. For this purpose, the force is transmitted to these roller groups from the adjusting means by way of a link arranged along the roller groups, wherein the adjusting means is preferably supported on two links, which connect in each case two roller groups, when in particular three roller groups are present. In order to transmit the force applied by the adjusting means, and in order to guide the bearing points of the roller groups, it is also possible here for coupling rods with respective slots to be provided, individual bearings of a respective side part for example of a scissors mechanism being guided in these slots.

A scissors mechanism of a respective roller group comprises side parts which are present at least one lateral end of the rollers of a roller group and are connected to one another in the form of a multi-bar linkage, in particular in parallelogram form.

Individual side parts of a roller group are supported in a pivotable manner on a frame or a side part of an adjacent roller group.

The rollers are typically mounted on both sides, but at least on one side, via two bearings. The latter are present, in particular, at the ends of the rollers and are arranged at the ends of the rollers on the left-hand and right-hand sides, as seen in the conveying direction.

The adjusting means of the adjusting device is preferably designed in order to pivot at least one of the roller-group planes, wherein adjustment by the adjusting means is possible in particular also during operation of the conveyor. Appropriate adjusting means are, in particular, hydraulic and/or electrically driven adjusting means in the form of cylinders or motors.

Insofar as the text above and below refers to adjacent roller pairs or adjacent rollers or bearings, the items are adjacent in a direction transverse to the main conveying direction of the root-crop conveyor. In for example a view of the main conveying direction from the right, the items, in particular in the form of potatoes, are conveyed from a first, left-hand roller group to an adjacent roller group, which is arranged further to the right.

The adjusting means is designed, in particular, in order to pivot all the roller-group planes. For this purpose, the adjusting means can be connected to at least one link, which acts directly or indirectly on all the roller groups.

The adjusting device preferably has at least two adjusting means, which are provided for one side of the root-crop conveyor, wherein the adjusting means which is provided for pivoting purposes can be actuated independently of a further adjusting means. In particular in a variant with a scissors mechanism, the further adjusting means is provided for actuating the scissors mechanism and, generally, gives rise to a change in distance between the axes of rotation within at least one roller group, and preferably all the roller groups. The then at least two adjusting means are provided for one side or also for both sides of the root-crop conveyor—on the left-hand and right-hand sides, as seen in the main conveying direction. It is preferably the case, however, that both sides each have two corresponding adjusting means.

To simplify matters, reference will often be made hereinbelow—as has also been the case above—to just one side of the root-crop conveyor, since the adjusting means which are provided in order to adjust the root-crop conveyor can be present in an identical state on both sides and also the means for bearing and guiding the rollers and the roller groups are present—usually in mirror-inverted fashion—on both sides, i.e. at the ends of the respective rollers on the left-hand and right-hand sides, as seen in the conveying direction. In contrast, drive means for rotating the rollers can be arranged in alternating fashion on the left-hand and right-hand sides.

The above design with two adjusting means can give rise, for example, to the distance between the rollers of a roller group being carried out independently of a pivoting of the roller-group plane of at least one roller group. The pivoting therefore takes place independently of any further adjustment of the root-crop conveyor.

In particular, the first and the second adjusting means are nevertheless articulated on a common link, which connects two roller groups, in particular wherein the adjusting means are not designed to be secured on the frame, which, first of all, makes it easier for a corresponding roller group to be installed and retrofitted and, furthermore, results in the bearing structures present being simplified, since, first of all, one and the same link serves as a bearing point for the adjusting means for adjusting for example the distance between the axes of rotation of a roller group and, furthermore, the same link can be used to achieve a relative movement between two adjacent roller groups.

An overall adjustment of the inclination of the root-crop conveyor can be carried out, according to the invention, by a further, third adjusting means of the adjusting device. Such a third adjusting means can give rise to adjustment in relation to a frame, for example by the root-crop conveyor being retained on the frame on one side by an alterable-length adjusting means. The same then also applies, in accordance with what has been said above, to the other end of the root-crop conveyor and a mirror-inverted design of the then two third adjusting means.

It is preferably the case that two adjacent roller groups are coupled to one another by means of a joint, designed in the form of at least a four-bar linkage. By way of the adjusting means which is provided for pivoting purposes, at least one of the bearing points of a roller group can be height-adjusted in relation to an adjacent bearing point, as seen in a side view, so that pivoting of the roller-group planes is possible as a result of the relative height adjustment. The accompanying cascading arrangement of the roller groups results in a separating and cleaning performance which can be adjusted to better effect and on an individual basis.

For positive guidance of the side parts in relation to pivoting of the roller-group planes and a change in distance between the axes of rotation or of the rollers of a respective roller-group plane, the side parts of the scissors mechanism are mounted, on both sides of the rollers, in respectively two coupling rods each with slots. The coupling rods are movable relative to one another via the connecting link, so that actuation of the adjusting means which is provided for pivoting purposes causes the coupling rods and the side-part bearings arranged thereon to be moved along therewith.

In particular, the slots are each present at the ends of the coupling rods, whereas a fixed-location pivot bearing is present in a central region between the slots. In order for the scissors mechanism to be actuated, in particular, by way of an adjusting means which is designed in the form of a cylinder which can move outward and inward, it is advantageous if, on one bearing side of the adjusting means, the connecting link is mounted, by way of a central bearing point, in a slot of the one connecting link and a pivot bearing of the other coupling rod, the pivot bearing being at a fixed location in relation to the other coupling rod, whereas, on the other bearing side of the adjusting means, the further connecting link is arranged, by way of its central bearing point, in the fixed-located pivot bearing and is located on the other coupling rod, by way of its further bearing point, in the slot. As far as this arrangement is concerned, outward movement of the adjusting means is accompanied by an increase in distance between the connecting links. As a result of the roller groups being coupled to the connecting links and a respective roller link to form a parallelogram-like four-bar linkage, and of the side parts of a respective roller group simultaneously being coupled in the form of a scissors mechanism, the change in distance between the connecting links is accompanied by a change in distance between the axes of rotation of a respective roller group.

In particular, two adjacent roller groups are connected to one another in the manner of a parallelogram, i.e. there are four bearing points, of which the connecting links—in any position—form a parallelogram. As a result, the adjacent roller groups are coupled to one another in an easily definable manner.

A prior-art configuration of a root-crop conveyor is provided when all the rollers of a roller group are mounted, on one side, in just one side part. On the opposite side, then, there is preferably likewise just one side part present in order to mount the rollers of the roller group, so that the axes of rotation of a roller group are in a fixed positional relationship with one another.

According to a further advantageous development of the invention, the root-crop conveyor has an eccentric-suspension arrangement at least for one roller group, wherein the adjusting means is in drive connection in particular with a disk on which the roller group is suspended in an eccentric manner by means of a suspension link. The disk, or some other transmission means, is preferably centrally mounted and has an off-center bearing for at least one suspension link of the roller group. This likewise applies, in a lateral view, to one side of the roller group. A preferably mirror-inverted suspension arrangement is then present on the opposite side of the roller group. Adjacent roller groups are connected by means of a five-bar linkage.

The disks are mounted, in particular, in a frame of the root-crop conveyor or in a frame of an overall apparatus in which the root-crop conveyor is inserted. This means that the pivoting of the roller-group plane can be changed in a particularly straight-forward manner.

The rollers of the root-crop conveyor are advantageously spiral rollers, of which the adjacent coil portions—as seen in a plan view and in relation to a main longitudinal axis of the roller—are at a distance apart of less than 5 cm. It is preferably the case that these spiral rollers, with outer shells and coils, are made of polyurethane.

The object mentioned in the introduction is also achieved by a piece of agricultural equipment used for storage purposes and having a root-crop conveyor according to the invention described above or hereinbelow.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
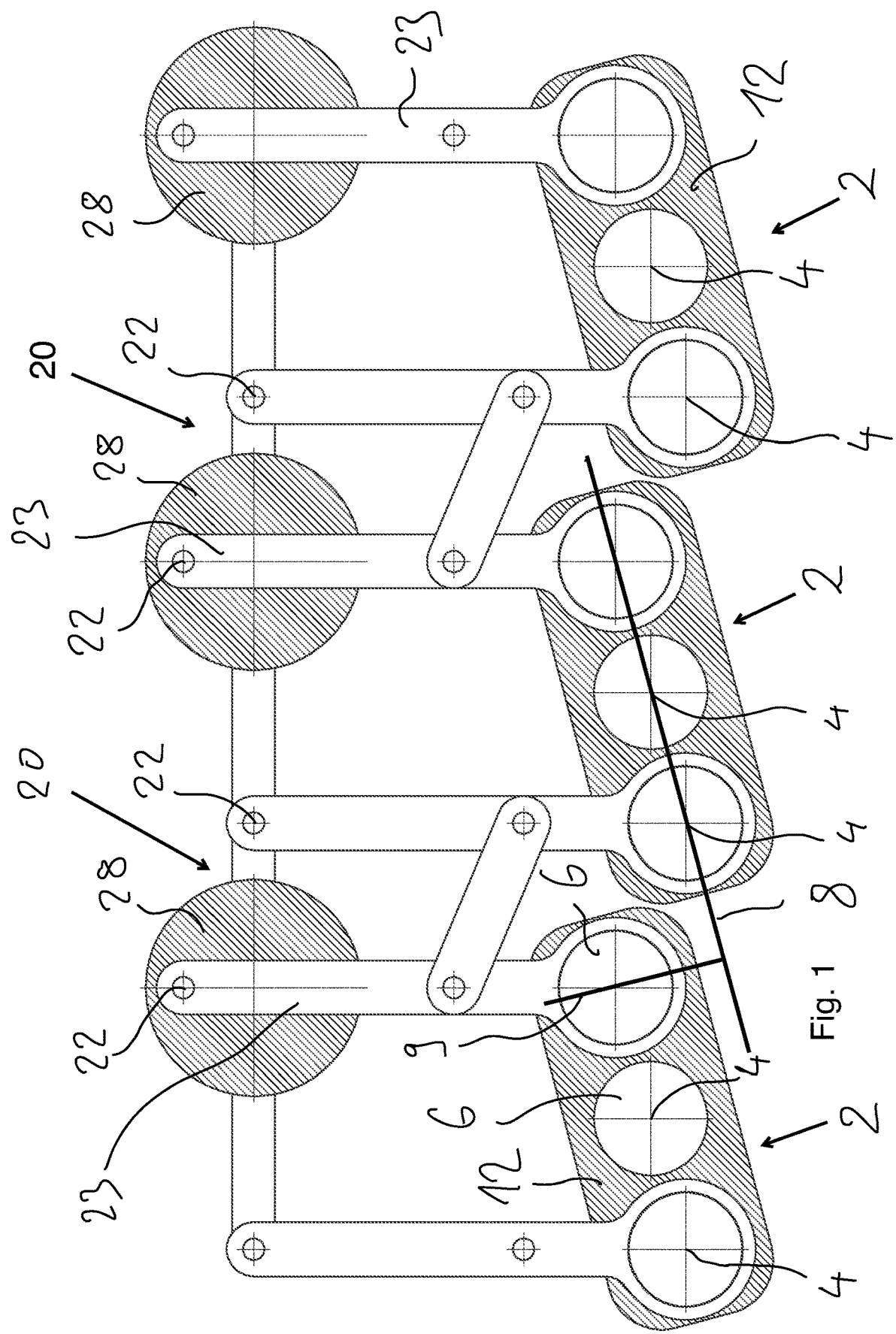
FIG. 1 shows a side view of part of a root-crop conveyor.

Individual technical features of the exemplary embodiments described hereinbelow can also give rise—in combination with the features of the independent claims—to developments according to the invention. If expedient, functionally equivalent parts are provided with identical reference signs.

A first exemplary embodiment of the invention (FIGS. 1 and 2) comprises three roller groups 2, of which the rollers 6 have axes of rotation 4. The axes of rotation 4 of the respective roller group 2 form a respective roller-group plane 8. According to the invention, an adjusting means (not illustrated specifically) of the adjusting device can be used, by way of actuation of a disk 28 of a respective roller group 2, to pivot the associated roller-group plane 8. This is achieved by way of a respective suspension link 23, which is suspended in an eccentric manner on a respective disk 28. The comparison of FIGS. 1 and 2 demonstrates the pivoting of the roller plane 8 of the central roller group 2. Pivoting takes place, on the one hand, in relation to the underlying surface 24, but also, in particular, in relation to the planes of the adjacent roller groups 2. The pivoting is likewise evident from a perpendicular line 9, which is situated on the plane 8 of the central roller group 2 and runs through the axis of rotation 4 of an adjacent shaft.

Figure 3:
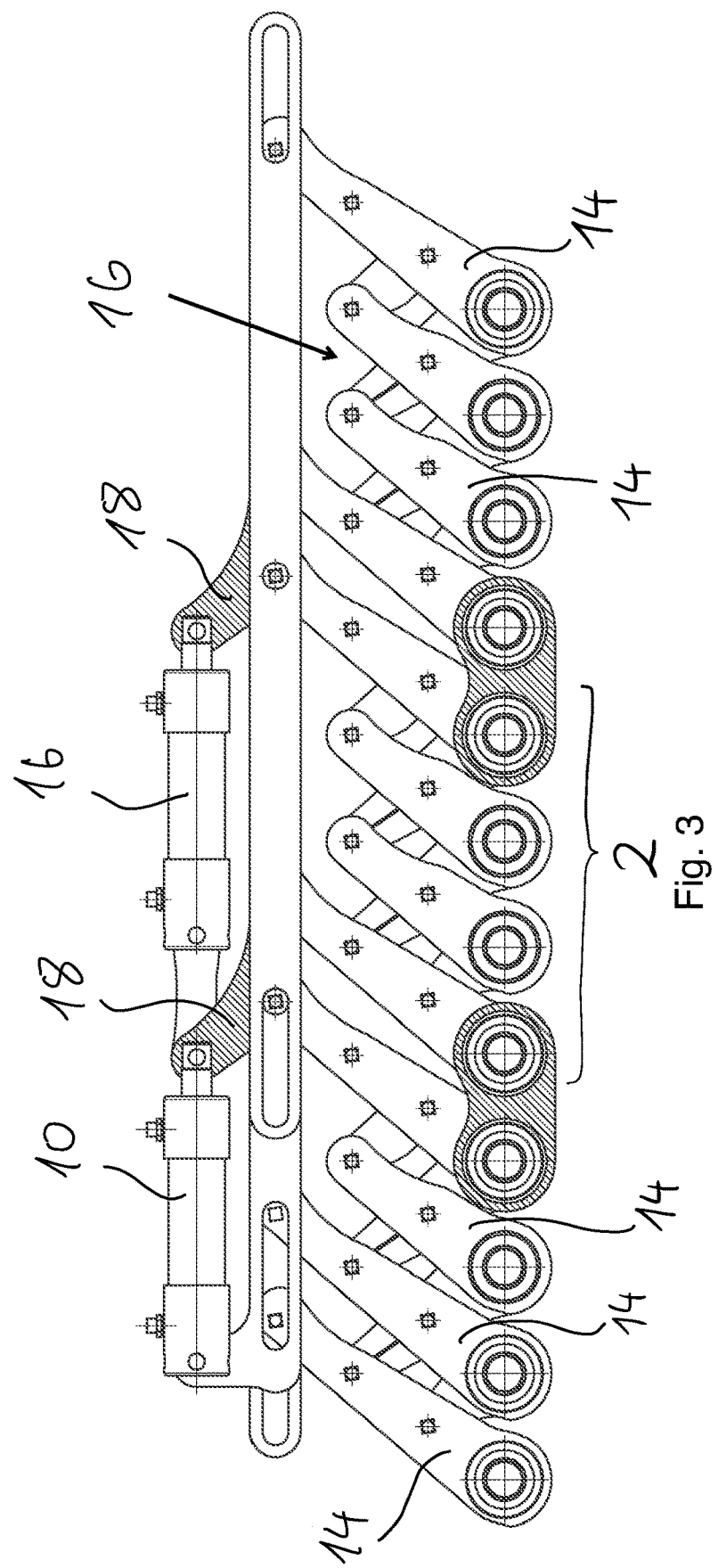
FIG. 3 shows a subject matter according to the invention.
Figure 4:
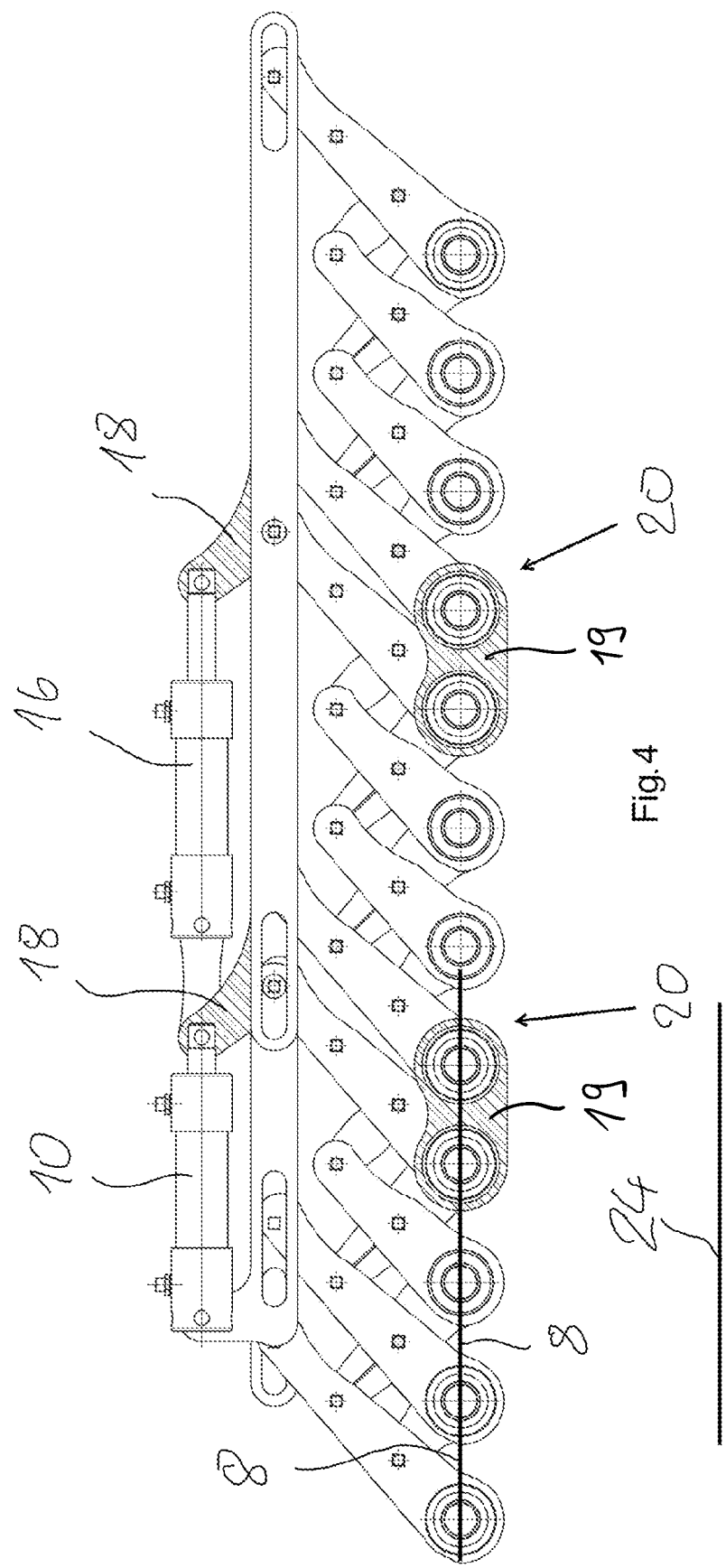
FIG. 4 shows the subject matter according to FIG. 3 in a further position.
Figure 5:
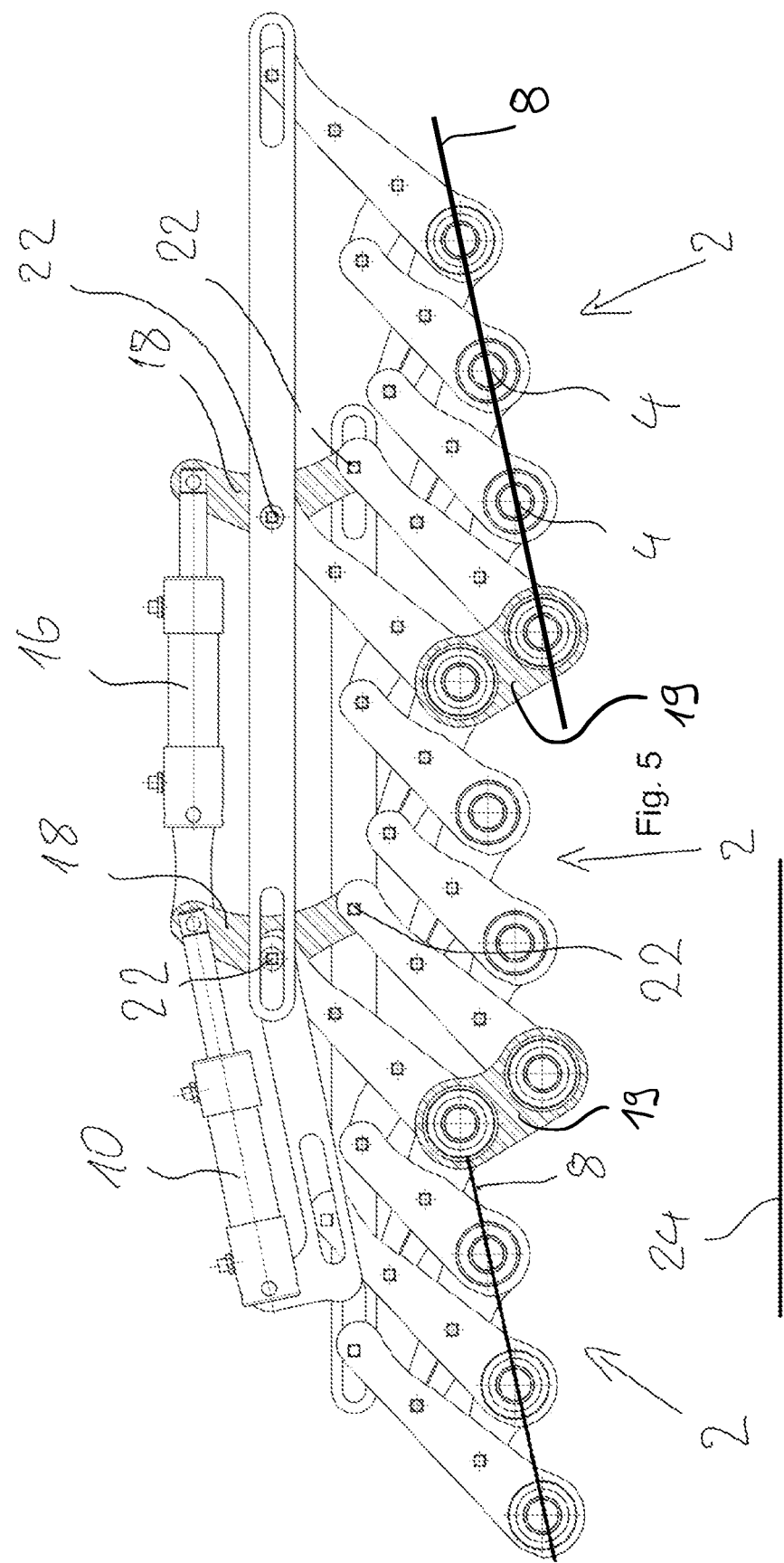
FIG. 5 shows the subject matter according to FIG. 4 in a further position.
Figure 6:
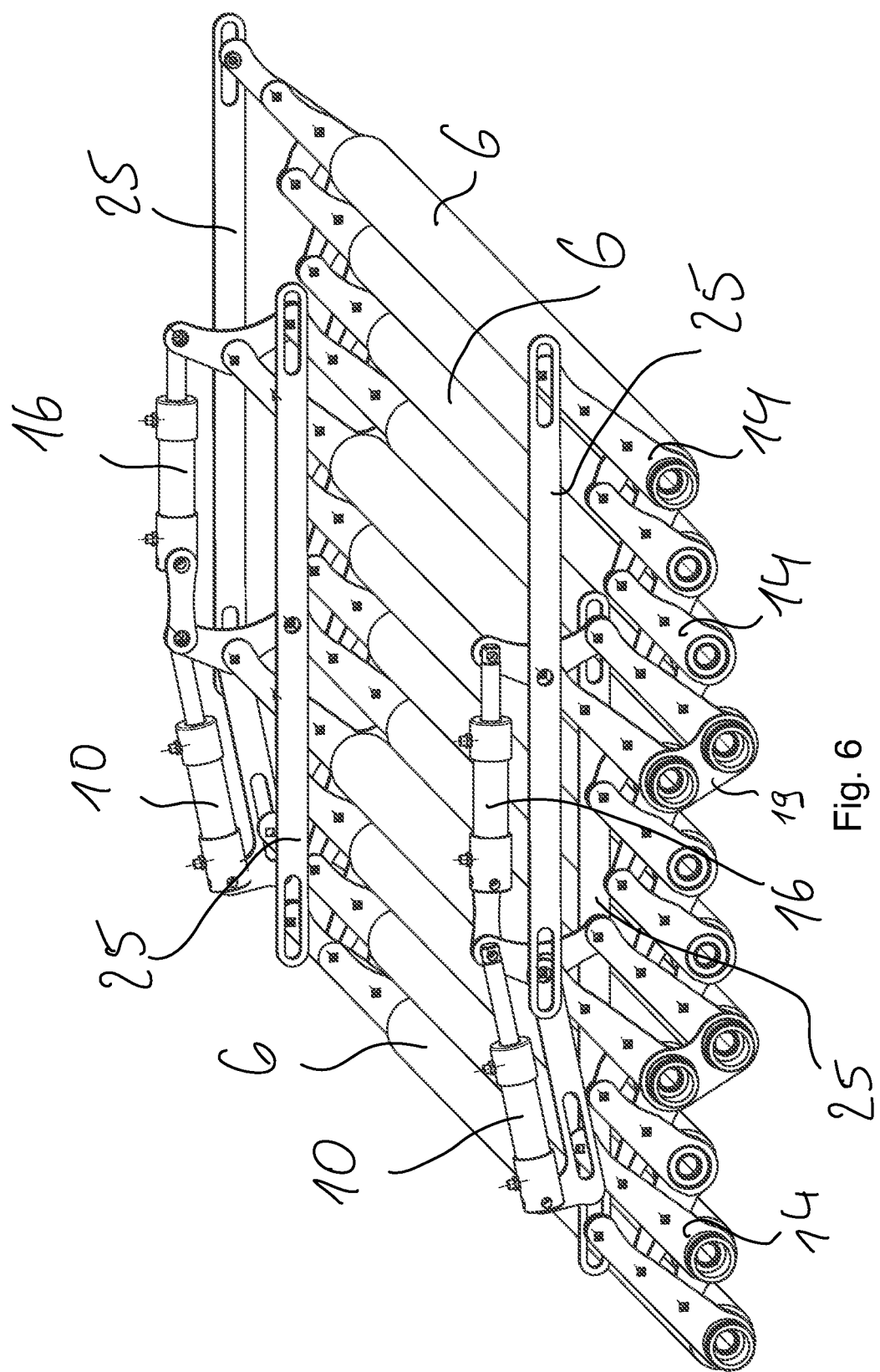
FIG. 6 shows a perspective illustration of the subject matter according to FIG. 5.

The further exemplary embodiment of FIG. 3 provides an adjusting means 10 for pivoting at least one of the roller-group planes 8 (cf. FIGS. 4 and 5). Here, there is pivoting in relation to the underlying surface 24.

The root-crop conveyor here has two adjusting means 10, 16, of which the adjusting means 10, which is provided for pivoting purposes, can be actuated independently of the further adjusting means 16. The two adjusting means 10, 16 are articulated on a common link 18, which connects two roller groups. Just the adjusting means 16, which is required for adjusting the distance between the axes of rotation 4 of the respective roller groups, is arranged on the right-hand connecting link 18 in FIG. 5.

In order to pivot the planes 8 of a respective roller group 2, the connecting link 18 is pivoted about the two upper bearing points 22 of FIG. 5, wherein the upper left-hand bearing point 22 is retained by the adjusting means 16, which for distance adjustment of the scissors mechanism or for adjusting the distance between the individual rollers of a roller group 2.

Figure 2:
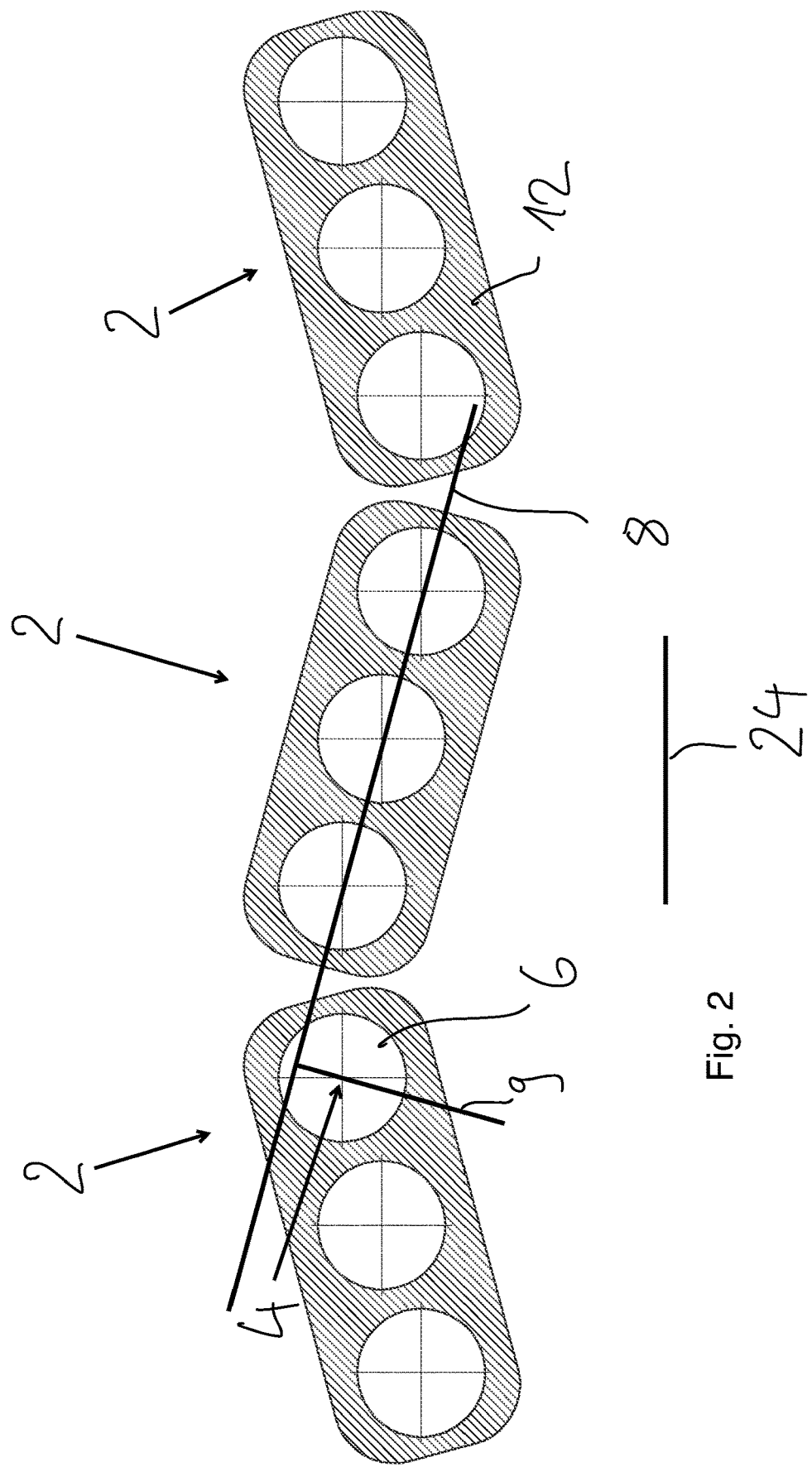
FIG. 2 shows the subject matter according to FIG. 1 in a new operating position and a further-abstracted state.

As is also the case for the exemplary embodiment of FIGS. 1 and 2, each roller group here is coupled to an adjacent roller group by means of a four-bar linkage, in particular in the form of a parallelogram, and the bearing points of adjacent roller groups can be height-adjusted by means of the adjusting procedure transmitted via the connecting link 18. The four-bar linkage likewise includes a further, roller link 19, which connects adjacent roller groups.

Whereas, in the case of the exemplary embodiment of FIGS. 1 and 2, the rollers 6 of a roller group 2 are mounted in just one side part 12, the rollers 6 of a roller group 2 of the exemplary embodiment according to FIGS. 3 to 6 are mounted in side parts 14 of a scissors-like connection or of a scissors mechanism. Coupling rods 25 with respective slots serve to guide the side parts 14 of the scissors mechanism and to adjust the roller groups 2, with positive guidance, by way of the adjusting means 10 and 16. They serve to assist the respective pivoting and rotary movements and also the change in distance between the associated side parts 14, and therefore serve as positive-guidance elements if use is made of just one adjusting means 10 for pivoting purposes and just one adjusting means 16 for changing the distance between the axes of rotation 4 of respective rollers 6. Of course, this, once again, applies to just one side of the conveyor. The other side of the roller group—the left-hand or right-hand side, as seen in the conveying direction—has identical mechanical couplings according to FIG. 6.

As a result of the roller groups 2 being coupled to the connecting links 18 and a respective roller link 19 to form a parallelogram-like four-bar linkage, and of the side parts 14 of a respective roller group 2 simultaneously being coupled in the form of a scissors mechanism, when the adjusting means 16 is actuated, a change in distance between the connecting links 18 is accompanied by a change in distance between the rollers 6 of a respective roller group 2 (cf. FIGS. 3 and 4).

Figure 7:
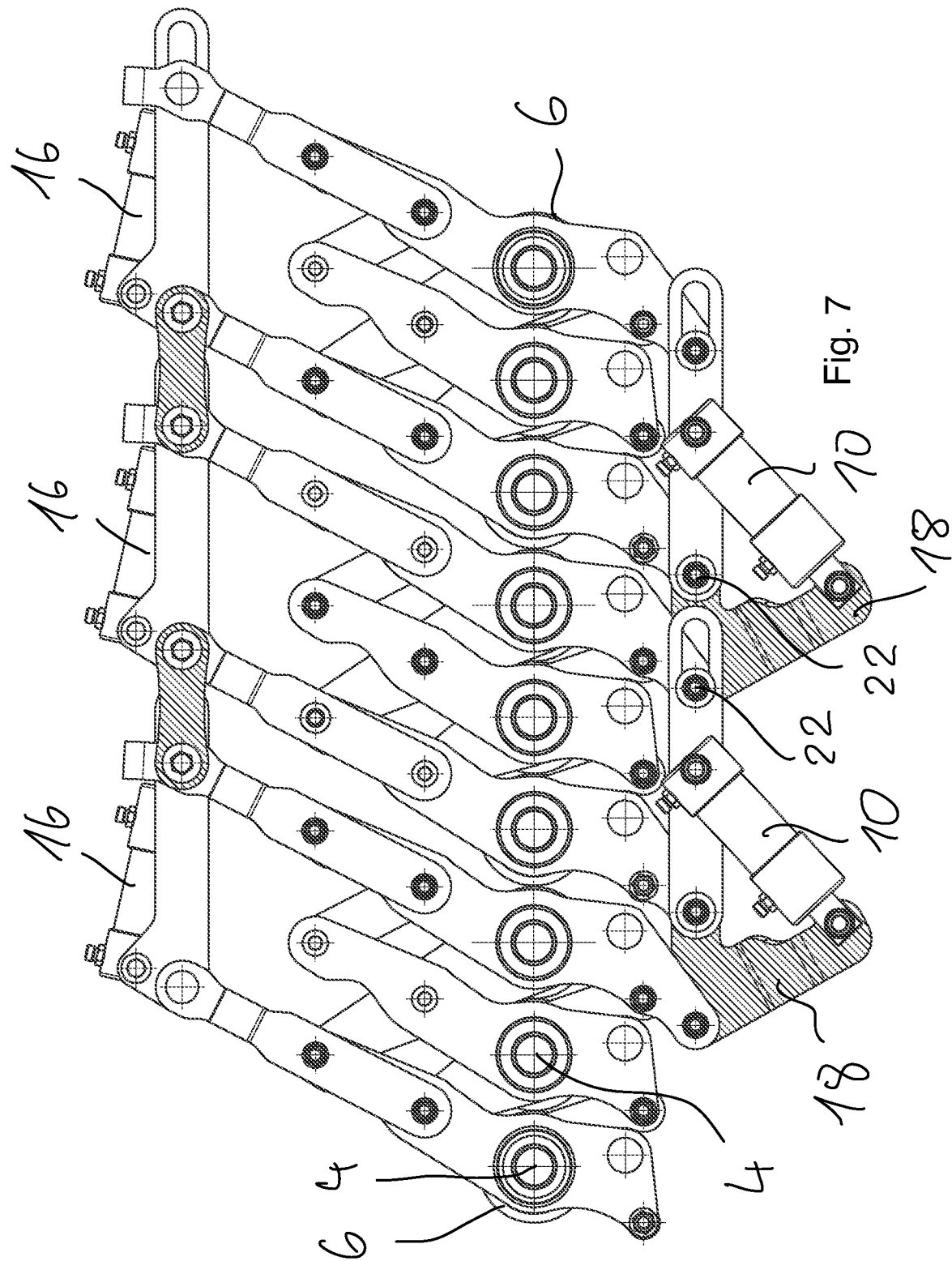
FIG. 7 shows a side view of part of a further subject matter according to the invention.
Figure 8:
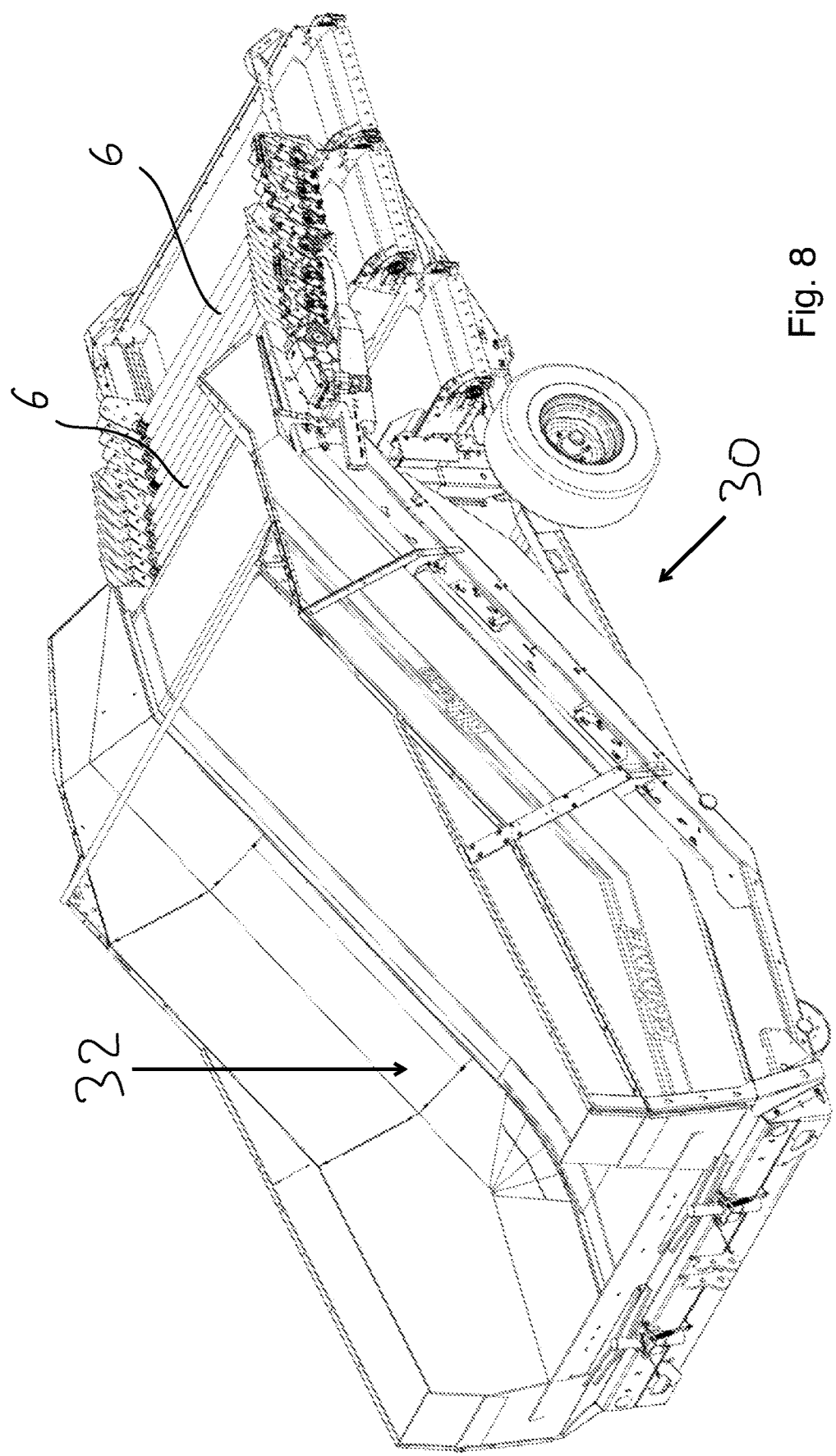
FIG. 8 shows a further exemplary embodiment of the invention.

Accordingly, the construction of the exemplary embodiment depicted in FIG. 7 has been somewhat simplified, since, there, two of the adjusting means 10 for pivoting the roller-group planes 8 are arranged on each side (beneath the rollers 6), while the adjusting means 16, which are used for adjusting the distance between the individual axes of rotation 4 of the rollers 6 of a respective roller group 2, are arranged above. Correspondingly, a root-crop conveyor according to the invention from FIG. 7 has in each case three adjusting means 16 and two adjusting means 10 on the left-hand and right-hand bearing sides, as seen in the conveying direction.

A piece of agricultural equipment used for storage purposes in the form of a receiving hopper 30 is provided with a root-crop conveyor which is designed for adjusting a cascading arrangement of the roller groups 2. Starting from a hopper 32, the root crops are cleaned and/or already separated on a root-crop conveyor according to the invention.

The invention claimed is:

1. A root crop conveyor for cleaning and/or separating root crops, the conveyor comprising:
    at least two adjacent roller groups, each of which have at least two rollers, which each rotate about a respective axis of rotation and of which the axes of rotation form a roller group plane,
    an adjusting device, which is provided with at least one adjusting means,
    wherein at least the rollers of at least one roller group are mounted, on one side, in at least one side part which interacts with the at least one adjusting means, such that actuation of the adjusting means can give rise to movement of the roller group plane relative to a frame in which the root crop conveyor can be arranged,
    wherein the adjusting device pivots the roller group plane,
    wherein the rollers of each of the at least two adjacent roller groups are connected to one another via a scissors mechanism.

2. The root crop conveyor as claimed in claim 1, wherein the adjusting means pivots at least one of the roller group planes.

3. The root crop conveyor as claimed in claim 2, wherein the adjusting device has at least two adjusting means which are provided for one side of the root crop conveyor, wherein a first of the adjusting means, which is provided for pivoting purposes, can be actuated independently of a second of the adjusting means.

4. The root crop conveyor as claimed in claim 3, wherein the at least two adjusting means are articulated on a common link, which connects two roller groups.

5. The root crop conveyor as claimed in claim 3, further including third adjusting means, which can adjust an inclination of the root crop conveyor as a whole.

6. The root crop conveyor as claimed in claim 1, wherein the two adjacent roller groups are coupled to one another by a joint in the form of at least a four bar linkage, and by way of the adjusting means, which is provided for pivoting purposes, at least one bearing point of a roller group can be height adjusted in relation to an adjacent bearing point, as seen in a side view.

7. The root crop conveyor as claimed in claim 6, wherein two adjacent roller groups are connected to one another in the manner of a parallelogram.

8. The root crop conveyor as claimed in claim 1, wherein the side parts of the scissors mechanism are mounted, on both sides of the rollers, in respectively two coupling rods each with slots.

9. The root crop conveyor as claimed in claim 1, wherein all the rollers of a roller group are mounted, on one side, in just one side part.

10. The root crop conveyor as claimed in claim 1, further including an eccentric suspension arrangement at least for one roller group.

11. A piece of agricultural equipment used for storage purposes, characterized by a root crop conveyor as claimed in claim 1.

12. The root crop conveyor as claimed in claim 1, wherein the adjusting device pivots the roller group plane in relation to an axis of rotation of a roller of an adjacent roller group.

13. The root crop conveyor as claimed in claim 4, wherein the adjusting means are not secured on the frame.

14. The root crop conveyor as claimed in claim 6, wherein the adjusting means, which is provided for pivoting purposes, acts on a connecting link, which connects two roller groups.

15. The root crop conveyor as claimed in claim 10, wherein the adjusting means is in drive connection with a disk of the eccentric suspension arrangement.

* * * * *